Figure 1:
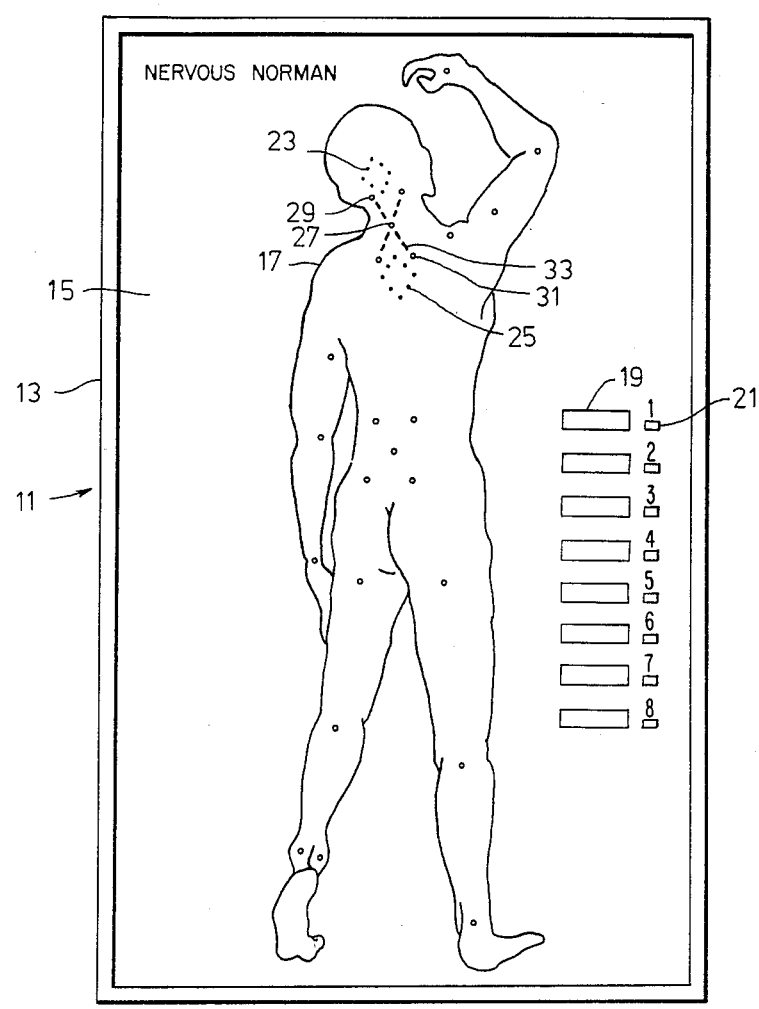

United States Patent [19]

Ferreira et al.

[11] Patent Number: 4,561,851
[45] Date of Patent: Dec. 31, 1985

[54] APPARATUS FOR DEMONSTRATING AND/OR TEACHING ALLEVIATION OF PAIN WITH TRANSCUTANEOUS ELECTRICAL NERVE STIMULATORS

[75] Inventors: Lloyd A. Ferreira, Princeton Junction, N.J.; Jeffrey S. Mannheimer, Holland, Pa.

[73] Assignee: Biostim, Inc., Princeton, N.J.

[21] Appl. No.: 506,116

[22] Filed: Jun. 20, 1983

[51] Int. Cl.[4] .............................................. G09B 23/30
[52] U.S. Cl. ................................... 434/272; 434/335; 434/338; 128/421; 128/695
[58] Field of Search ............... 434/262, 267, 268, 272, 434/327, 335, 338; 128/421, 422, 630, 695, 696

[56] References Cited

U.S. PATENT DOCUMENTS

| | | | |
|---|---|---|---|
| 2,196,298 | 4/1940 | Garrison et al. | 438/268 |
| 2,207,153 | 7/1940 | Judovich | 434/272 |
| 3,731,400 | 5/1973 | Pile et al. | 434/272 |
| 3,911,930 | 10/1975 | Hagfors et al. | 128/421 |
| 4,254,776 | 3/1981 | Tanie et al. | 128/421 |
| 4,323,351 | 4/1982 | Goldsmith | 434/272 |

Primary Examiner—Richard C. Pinkham
Assistant Examiner—Leo P. Picard
Attorney, Agent, or Firm—Raymond F. Kramer

[57] ABSTRACT

An apparatus for demonstrating and teaching the application of transcutaneous electrical nerve stimulation to a human or animal body includes a representation of such body with receptors thereon at different sites thereof corresponding to treatment sites of different pains which could afflict the body, electronic circuits capable of visually indicating locations of pain when switched on, and electronic circuits for visually showing paths of transcutaneous electrical nerve stimulation on the body representation when a transcutaneous electrical nerve stimulator is connected to the receptors and is activated. When the correct receptors are connected to T.E.N.S. unit for the treatment of a particular visually indicated pain and the T.E.N.S. unit is turned on the indication of the pain is cancelled. Also disclosed are apparatuses with which the electrical stimulator employed is of a type other than a T.E.N.S. unit, such as bone growth and muscle stimulators. Also within the invention is a method for demonstrating and teaching the application of electrical stimulation to a human or animal body by use of a demonstrating and teaching aid or apparatus which is adapted to be connected to an electrical stimulator.

9 Claims, 3 Drawing Figures

APPARATUS FOR DEMONSTRATING AND/OR TEACHING ALLEVIATION OF PAIN WITH TRANSCUTANEOUS ELECTRICAL NERVE STIMULATORS

This invention relates to demonstrating and teaching the application of electrical stimulation to human and animal bodies. More particularly, it relates to the application of transcutaneous electrical nerve stimulation to the human body for alleviation of pain at any of several particular locations thereof. The invention also is of a method for demonstrating and teaching the application of electrical stumulation to the human body with the aid of an electrical stimulator, such as a T.E.N.S. unit, and a demonstrating and teaching aid adapted to be employed in conjunction with such stimulator.

Biological electrical stimulators are known in the art and have recently been achieving acceptance by the health related professions to relieve pain, to promote healing of wounds, to promote bone and muscle growth, to regulate heart action and to improve hearing. One of these successful areas of use of such biological electrical stimulators is in alleviating pain by means of transcutaneous electrical nerve stimulation (T.E.N.S.). Various such devices have been described in the literature and in the patent art. Representative of a manufacturer's materials describing and illustrating transcutaneous electrical nerve stimulators of the type employed in conjunction with the present demonstrating and teaching aid are pamphlets entitled Biostim System 10 TM for Complete Control and How to Operate Your System 10 TM T.E.N.S., and an instruction manual entitled Biostim System 10 T.E.N.S. Stimulator, all issued by Biostim, Inc., in 1981 and 1982. Such T.E.N.S. devices are also described in U.S. patent applications Ser. Nos. 390,026 of the present inventors and 390,027 of Lloyd A. Ferriera, one of the present inventors, both of which applications were filed on June 18, 1982. Although operatively successful T.E.N.S. units and other biological stimulators have been made and tested and many are now in routine daily use, it has been discovered that there exists a real need for a teaching aid or demonstrating apparatus which graphically shows the operation of such biological stimulators, helps to make them more readily understandable to a user and can be employed to help train the prospective users of the electrical stimulators. Accordingly, there has been invented a demonstration aid on which a human is illustrated, which aid includes switches that allow various areas of pain to be shown and receptors connectable to a biological stimulator, such as a T.E.N.S. unit, for simulating the application of electrical stimulation to particular areas of the illustrated body. The invented apparatus shows the function of the electrical stimulator and the characteristics of the stimulation applied, and can be used as a test to determine where electrodes should be located for optimum stimulation. For example, to alleviate pain with a T.E.N.S. unit, the pain location, indicatable on the teaching aid, is noted, appropriate connections of the T.E.N.S. unit to receptors near it are made and the T.E.N.S. unit is operated so as to appear to apply electrical stimulation to the relevant area. The nature of the stimulation is visible on the teaching aid and when such is applied in the correct area (with connections of the T.E.N.S. unit to the proper receptors) the indication of pain on the teaching aid will be cancelled.

A search made in the U.S. Patent and Trademark Office in subclasses 434-335; -338; -379; and 434-85;-262; -267; -268; -272; -327; and -340 resulted in the finding of the following relevant U.S. Pat. Nos. 2,196,298; 3,688,008; 3,704,528; 3,731,400; 4,021,933; 4,254,562; and 4,273,540. In U.S. Pat. No. 2,196,298 a mannequin has illumination means associated with it in such a way that when the viewer correctly identifies a body location as a pressure point illumination means, which causes a visual display simulating blood flow, is turned off. U.S. Pat. No. 3,688,008 simulates the human nervous system. U.S. Pat. No. 3,704,528 shows blood flow and in U.S. Pat. No. 3,731,400 a section affected by a squeezed nerve when a vertebra is moved is illustrated by illumination thereof. The remaining patents mentioned also relate to teaching devices wherein electronic circuitry is employed to teach body functions, etc. However, none of the patents illustrates, suggests or teaches the present invention or makes it obvious. In particular, none of the patents shows a conjoint use of a biological electrical stimulator, such as a T.E.N.S. unit, with an illustration of a human or animal body, to show the effect of operation of the T.E.N.S. unit on the body and to test for proper use of the T.E.N.S. unit to alleviate pain at indicated locations.

In accordance with the present invention an apparatus for demonstrating and/or teaching the application of transcutaneous electrical nerve stimulation to a human or animal body for the alleviation of pain at a location thereof comprises a representation of such a body with a plurality of receptors thereon at different sites on such representation whereat electrodes would be placed for treatments of different pains afflicting a human or animal, a plurality of electronic circuits with means included therein for visually representing the locations of particular pains afflicting the human or animal in response to the operation of related switches, switches for turning on the representations of any of the pains selected, electronic circuitry for visually showing transcutaneous electrical nerve stimulation on the representation of a human or animal at a site near the receptors when a transcutaneous electrical nerve stimulator is connected to such receptors and is activated, and electronic circuitry for cancelling the representation of pain when the T.E.N.S. unit is properly connected to the receptors at the locations where T.E.N.S. electrodes would be applied on a human or animal to treat and diminish or cancel pain at the indicated locations. Also within the invention are broader aspects thereof in which a biological stimulator is employed at different settings and the different characteristics of the stimulation resulting are illustrated on the demonstration and teaching apparatus. The process of using the biological stimulator in conjunction with the present apparatus is also described and claimed.

Figure 2:
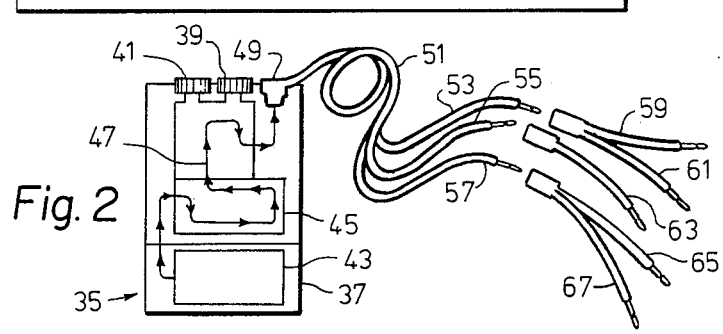
Figure 3:
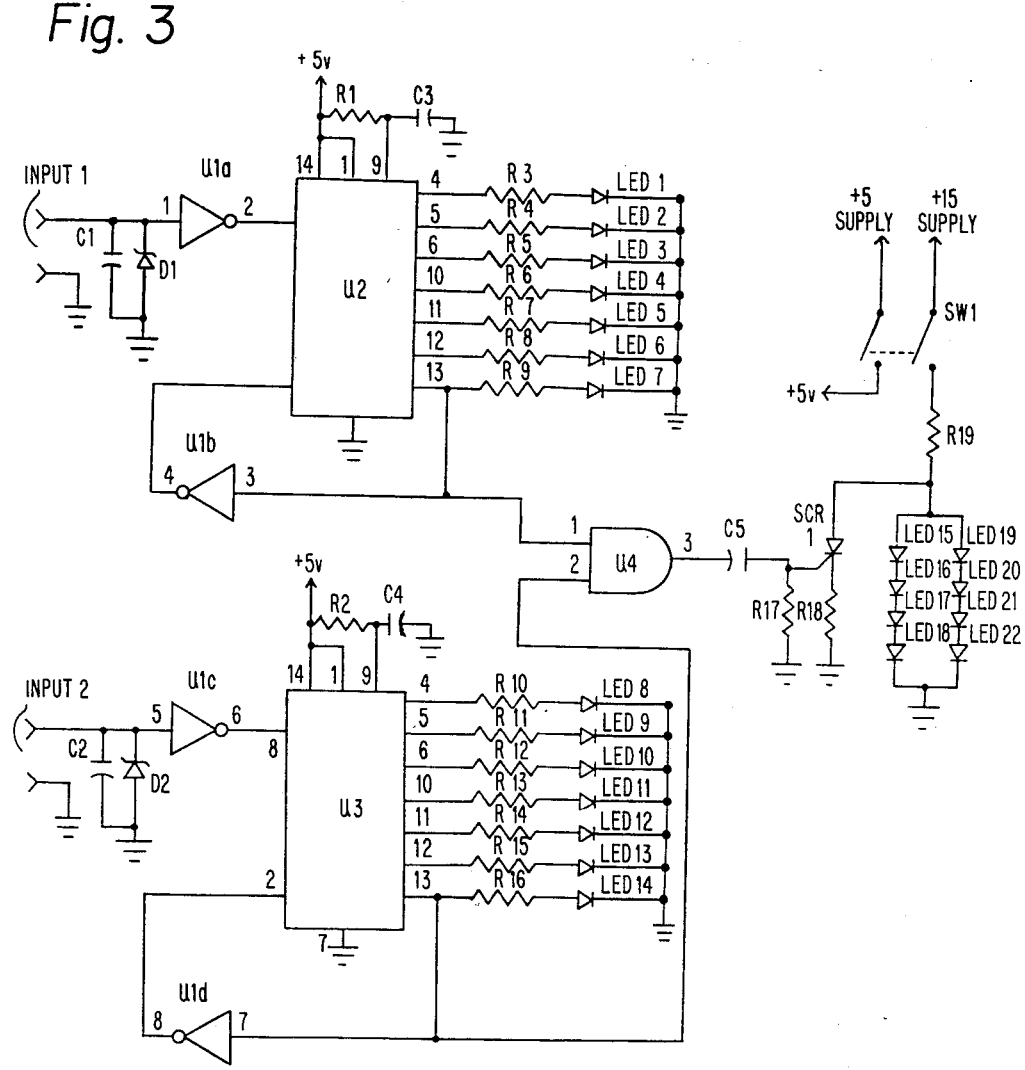

The invention will be readily understood by reference to the specification, taken together with the drawing in which:

FIG. 1 is an elevational view of a demonstrating and/or teaching aid or apparatus of the present invention with a representation of a human body thereon;

FIG. 2 is a partially schematic elevational view of a T.E.N.S. unit of the type employed together with the apparatus of FIG. 1; and FIG. 3 is an electronic circuit diagram illustrating a single pain site and treatment indicators, with provision for canceling the representation of the pain when the input leads from two modes of treatment from a T.E.N.S. unit are inserted in correct receptors, which represent electrode positions for the treatment of the indicated pain.

In FIG. 1 demonstrating and teaching apparatus 11 includes framing 13 and substantially planar translucent or partially transparent facing or cover 15 on which there is a representation 17 of a human body, in this case nick-named Nervous Norman. Indicia 19 describe various types of pain which may afflict the human body and which are treatable by T.E.N.S. so as to alleviate or mitigate such pains. Switches 21, when activated, indicate locations of the pain described in the indicia 19, as such indicia correspond to particular switches. Thus, the areas of pain or "diamond" sections 23 and 25, illuminated by L.E.D's. when uppermost switch 21 (of the series of 8 switches) is depressed or activated, represent the pain of occipital neuralgia. The other pains represented, the areas of which are not specifically illustrated on the representation of the human body in FIG. 1, are cervical strain (whiplash); cervical radiculopathy pain (referred to right ulnar extremity); bilateral low back pain; bilateral buttock pain referred from low back; sciatic pain; diabetic neuropathy; and peripheral nerve injury (ulnar). Green L.E.D's. may be provided to illustrate the pain sites 23 and 25 or red or other L.E.D's. may be so employed. Receptors 27, 29 and 31 and the additional two receptors opposite receptors 29 and 31 are provided to receive leads and inputs from a T.E.N.S. unit like that schematically shown in FIG. 2. Receptor 27 is a ground and receptors 29 and 31 represent split receptors from which a simulated stimulating current flows to the ground when one mode of stimulation is applied (split between two connecting means). Similarly, a second mode of stimulation may be applied to the corresponding additional receptors near the indicated pain sites so that the illustrated treatment is in two modes.

When the T.E.N.S. unit is connected to the receptors for treatment of the represented occipital neuralgia pain and the T.E.N.S. unit is switched on, at least with respect to one mode, treatment-indicating L.E.D's. in the circuitry behind the figure will be electronically activated in response to the stimulation from the T.E.N.S. unit and they will visually simulate paths of nerve stimulating current flow, as at 33. The L.E.D's. that represent the path of current flow will glow and fade to indicate pulsations, and may increase or diminish in brightness to illustrate the magnitude of the stimulation applied.

It is a special advantage of this invention that the electronic circuitry, to be referred to later, is such that when both modes or channels of stimulation available from the T.E.N.S. unit are correctly communicated with the receptors to treat the indicated pain (either with split receptors [five contacts] or single receptors [three contacts], as applicable), the L.E.D's. or other indicators to denote the pain area will be extinguished, to symbolize the overcoming of the pain by the electrical nerve stimulation. Other such apparatuses may be adapted to have only single modes of stimulation applied to the demonstration aid or educational apparatus, with the cancellation of the indication of the pain area being effected when the treatment leads are correctly installed in the appropriate two receptors, one of which will be a ground.

In FIG. 2 T.E.N.S. unit 35, substantially like such units described and illustrated in U.S. patent applications Ser. Nos. 390,026 and 390,027, previously mentioned, each of which is incorporated herein by reference, includes a casing 37 with combined mode or channel on/off switches and output controls 39 and 41, battery 43 and socket (not shown) into which is fitted connector 49, to which is attached cable 51. Inside the T.E.N.S. unit circuit boards, printed circuits or integrated circuits are employed, such as that designated by numeral 45, through which electrical current, symbolized by numeral 47, flows along an appropriate path to the socket, connector 49 and cable 51. In addition to amplitude controls of the separate channels or modes, represented by numerals 39 and 41, other controls, not illustrated, are preferably present to regulate the pulse width, burst mode (on/off) and rate or frequency. Cable 51 includes three separate leads, ground 55 and leads for each of the two different modes 53 and 57. More modes may be provided if desirable. Splitting or Y extensions are provided for leads 53 and 57, with leads from 53 being numbered 59 and 61 and those from 57 being numbered 65 and 67. Such extensions allow applications of stimulations to additional body areas, which is often useful so as to treat wide area pains more effectively.

In FIG. 3 the schematic diagram reflects the circuitry for a single pain site. As will be evident additional and separate inputs, switching and circuitry will be provided for additional pain sites. Of course, such additional sites will usually be present to simulate on the demonstration and teaching aid other areas of pain and the T.E.N.S. treatments thereof. Also, additional L.E.D. strings per site will utilize circuitry like that shown and the selected correct inputs of the T.E.N.S. unit should be connected to U4 to cancel the L.E.D's. numbered L.E.D 15 through L.E.D. 22 in FIG. 3.

The circuitry illustrated in FIG. 3 will not be described in detail because it is evident to one of skill in the art reading the drawing what the diagram signifies and how the circuits operate. To put in words what is evident from the drawing would be redundant. However, the following parts list is given to identify specific components of the circuitry. R1 and R2 are 27,000 ohm—¼w—5% resistors, R3-R16 are 270 ohm—¼w—5% resistors, R17 is a 1,000 ohm—¼w—5% resistor, and R18 and R19 are 150 ohm—¼w—5% resistors. The condensers are all ceramic general purpose condensers C1 and C2 are 0.01 microfarad—50 v condensers, C3 and C4 are 1 microfarad—50 v condensers, and C5 is a 0.1 microfarad 50 v condenser. D1 and D2 are IN523-08—4.7 v Zener circuits, SCR1 is a C103Y (General Electric Co.) rectifier, U1 is a 7404 (or equivalent), U2 and U3 are 74164 (or equivalent) and U4 is a 7408 (or equivalent). Of the L.E.D's., the red ones, used to indicate the flow of treating stimulation, are LED 1–LED 14 and are MV5753, made by General Instrument Co., and LED 15–LED 22 are MV64530, also made by General Instrument Co., and are green in color. Of course, when desired, such L.E.D's. may be reversed so that the pain is indicated in red and pain alleviating stimulation from the T.E.N.S. unit is indicated in green. Switch SW1 may be of a double-pole single-throw or double-pole double-throw type. In the FIG. 3 illustration the exact numbers of L.E.D's. employed are illustrated but such numbers are not shown in FIG. 1, for ease of illustration and to distinguish pain areas from treatment paths.

In operation, often as a demonstration apparatus or as a teaching aid, the present invention allows selections of any of numerous pain sites on the human body which may then be "treated" with a standard T.E.N.S. unit, such as the Biostim System 10 stimulator. Prior to actually using the teaching aid the student or prospective user of the aid will be given brief instructions as to the operation of the T.E.N.S. unit and the principles of T.E.N.S. Then he or she will be asked to select a particular pain type by pressing one of switches 21 and the location of that pain will instantly be indicated on the illustration of the human body on the apparatus, usually in diamond or square form, as shown, but other shapes for such pain areas may also be defined by the L.E.D's. The pain pattern illustrated will depend on the number and locations of the L.E.D's. and such are easily variable when the circuitry is being assembled. The student will then be asked to properly locate the various leads by inserting the ends thereof in the corresponding receptors for treating the illustrated pain.

When the leads are properly connected, with care being taken to make sure that the ground lead and the ground receptor are matched, the T.E.N.S. unit will be set to desired stimulation characteristics and will be turned on. In the embodiment of the invention illustrated in FIGS. 1 and 3 five leads and five receptors are employed and when both channels of T.E.N.S. inputs to the teaching aid are activated the illuminated pain areas will disappear, as the L.E.D's. are extinguished. However, in other embodiments of the invention such extinction can be effected when only two or three leads and two or three corresponding receptors are used and/or only one channel of stimulation is employed. The student can vary the settings of the T.E.N.S. unit and change the types of stimulation to the teaching apparatus, which will alter the signals sent to the appropriate L.E.D's. and will allow the student to see representations of the different types of stimulation being applied. After treating one type of pain, the student may be tested with respect to the treatments of other types, until he has mastered the technique of using the T.E.N.S. unit.

In addition to performing very effectively as a teaching aid the invented apparatus, used in conjunction with a T.E.N.S. unit, makes an eye-catching demonstration and sales promoting apparatus. It is especially useful at meetings of health care personnel, where doctors, nurses and therapists are attracted to and intrigued by the demonstration apparatus, which is preferably about life size, and quickly learn how easy it is to employ the T.E.N.S. units being demonstrated in conjunction with the apparatus. While larger apparatuses are preferred the present aids may be made smaller too, often for ease of transportation and storage, and are also demonstrably effective.

The present invention provides an easily usable and effective teaching aid and demonstrating apparatus for use with biological electrical stimulators of various types and also provides an easy method for learning how to use and for demonstrating the use of such a biological stimulator. While the illustrated aid is for use with T.E.N.S. units corresponding apparatuses are also useful with other electrical stimulators, such as bone growth stimulators and muscle action stimulators. In the use of biological electrical stimulators broadly, and specifically with respect to T.E.N.S. units, the "hands-on" operation of the stimulator in conjunction with the apparatus of this invention provides a superior learning experience, compared to textbook study. The clinician can actually try out the described electrode placement techniques, using one or two electrodes per channel with a common ground, arranged in overlapping or linear fashion, different from conventional T.E.N.S. techniques. Also, the representations or simulations by the apparatus of the types of stimulation applied help the student better to understand the nature of the treatment of a patient. In addition to the serious aspect of the invention, relating to teaching and demonstrating the use of T.E.N.S. units or other stimulators, use of the present invention is fun and this augments the learning process and makes the demonstrations more interesting and effective.

Variations or modifications of the invention may be made which are intended to be within its scope. For example, although a glass or clear plastic, (e.g., polymethyl methacrylate, nylon, fiberglass reinforced polyester) surface material may be employed for the cover or facing of the aid, onto the front or back side of which the figure representing the human body may be painted or otherwise reproduced, such facing may be curved or may conform somewhat to the contours of human body. Also, a three dimensional manniquin may be used, with a transparent or translucent skin and with the electronic circuitry inside. Such skin may be of polypropylene, polyethylene or PVC, or other suitable material, in addition to the previously named plastics. Various means may be used to obscure the circuitry while still allowing the L.E.D's. or other illumination means, such as liquid crystals, to be seen. Instead of employing illumination means to indicate the type of stimulation being applied to the apparatus audible means may be substituted or a combination of visible and audible means may be employed. The L.E.D's. or other illumination may be external to the apparatus rather than being enclosed within it. Y-shaped adapters may be used to split the leads to the apparatus and such may be split further in suitable circumstances. Different receptors and leads may be color coded (like red for a ground and black for other leads) to prevent any errors which might damage the circuitry. Instead of utilizing a rectangular frame the "frame" may be of a shape which conforms to the exterior of the figure. Instead of employing tube-like receptors for the fitting ends of the lead wires one may utilize other types of receptors and contacts and in some instances T.E.N.S. electrodes, such as those employed to contact the human body, may be used, with the electrical contact being made by conductive means on the electrode or even by a conductive gel, such as is used in applications of such electrodes to the human body.

With respect to the electronic circuitry, an example of which has been given in FIG. 3, it is considered that various changes therein may be made so long as the same desirable results are obtained. One of skill in the art will know how to modify such circuitry and it is not considered necessary to describe the multitude of possible variations herein which are within the present invention. Thus, instead of L.E.D's. liquid crystals may be substituted and instead of the particular capacitors, resistors, transistors, integrated circuits, wires and switches, similar items of different values and similar items of other configurations and in altered relationships may be substituted. Also the circuitry may be made to be specifically adapted to and more efficiently operative with other types of T.E.N.S. units or other biological electrical stimulators.

The invention has been described with respect to various illustrations and embodiments thereof but is not to be limited to these because it is evident that one of skill in the art with the present specification before him will be able to utilize substitutes and equivalents without departing from the invention.

What is claimed is:

1. An apparatus for demonstrating and/or teaching the application of transcutaneous electrical nerve stimulation to a human or animal body for the alleviation of pain at a location thereof which comprises a representation of such a body with a plurality of receptors thereon at different sites on such representation whereat electrodes would be placed for treatments of different pains afflicting a human or animal, a plurality of electronic circuits with means included therein for visually representing the locations of particular pains afflicting the human or animal in response to the operation of related switches, switches for turning on the representations of any of the pains selected, electronic circuitry for visually showing transcutaneous electrical nerve stimulation on the representation of a human or animal at a site near the receptors when a transcutaneous electrical nerve stimulator is connected to such receptors and is activated, and electronic circuitry for cancelling the representation of pain when the T.E.N.S. unit is properly connected to the receptors at the locations where T.E.N.S. electrodes would be applied on a human or animal to treat and diminish or cancel pain at the indicated locations.

2. An apparatus according to claim 1 for demonstrating and/or teaching the application of transcutaneous electrical nerve stimulation to a human wherein the representation of a human body is substantially planar and is on an at least partially light transmitting material, which conceals the electronic circuitry thereof from the viewer while allowing transmission of light through the material to represent and indicate selectable locations of pains and to represent transcutaneous electrical nerve stimulation, and the electronic circuitry activates light sources to indicate a pain location when a related switch is activated and to indicate T.E.N.S. treatment when a T.E.N.S. unit is connected to the receptors.

3. An apparatus according to claim 2 which comprises framing for the light transmitting material, which framing is adapted to stand so that the representation of the human body thereon is vertical, and in which apparatus the substantially planar material on which the human body is represented is glass or a synthetic organic polymeric plastic having an etched, ground or otherwise treated or manufactured surface away from a viewer which obscures circuitry behind the planar material and within the framing and allows transmission of the lights which represent pains and transcutaneous electrical nerve stimulation.

4. An apparatus according to claim 3 wherein means for representing pains and transcutaneous electrical nerve stimulation are light emitting diodes (L.E.D's.).

5. An apparatus according to claim 4 wherein when a T.E.N.S. unit is connected to receptors for treating pain at an indicated location on the representation of the human body of the apparatus the frequency of stimulation is indicated by intermittent illuminations of the appropriate L.E.D's.

6. An apparatus according to claim 5 wherein the L.E.D's. that indicate pain sites on the human body representation are turned off when a T.E.N.S. unit having two modes of stimulation is connected to the appropriate receptors and both modes are turned on.

7. A method for demonstration and/or teaching with a demonstrating and teaching aid the application of transcutaneous electrical nerve stimulation to a human or animal body for the alleviation of pain at a location thereof, which comprises turning on a switch to activate a pain indicator on the body representation to indicate a location of a pain affecting a part of the body attaching electrode contact members of T.E.N.S. unit to receptors on a representation of a human or animal body, which receptors correspond to locations on such body whereat electrodes would be placed for treatment of the pain indicated, and operating the T.E.N.S. unit in such manner as it would be operated to alleviate actual pain on a human or animal at the indicated location, whereby electronically, due to internal circuitry of the demonstration and/or teaching aid, the indication of pain on such aid will be cancelled when the simulated treatment applied is correct.

8. An apparatus for demonstrating and/or teaching the application of transcutaneous electrical nerve stimulation to a human or animal body for the alleviation of pain at an indicated location thereof which comprises a representation of such a body containing electronic circuitry adapted to coact with such circuitry of a T.E.N.S. unit and containing receptors for receiving T.E.N.S. leads so that when such leads are attached to the receptors and the T.E.N.S. unit is turned on, so as to apply different frequencies of stimulation to an area of pain, the apparatus will indicate by visual means the applications of different frequencies of stimulation thereto at the area of the pain.

9. An apparatus according to claim 8 wherein the visual means for indicating stimulation by the T.E.N.S. unit are light emitting diodes.

* * * * *